United States Patent [19]

Kudo et al.

[11] Patent Number: 5,346,764
[45] Date of Patent: Sep. 13, 1994

[54] RESIN LAMINATES

[75] Inventors: Hiroshi Kudo, Tokyo; Shinji Kawamura, Himeji, both of Japan

[73] Assignee: Idemitsu Petrochemical Co., Ltd., Tokyo, Japan

[21] Appl. No.: 73,291

[22] Filed: Jun. 7, 1993

Related U.S. Application Data

[63] Continuation of Ser. No. 830,342, Jan. 31, 1992, abandoned, which is a continuation of Ser. No. 386,081, Jul. 26, 1989, abandoned.

[30] Foreign Application Priority Data

Jul. 30, 1988 [JP] Japan ................. 63-190984

[51] Int. Cl.$^5$ .................. B32B 27/08; B32B 7/12
[52] U.S. Cl. .................. 428/349; 428/516
[58] Field of Search ............ 428/349, 516, 347

[56] References Cited

U.S. PATENT DOCUMENTS

| | | | |
|---|---|---|---|
| 4,265,949 | 5/1981 | Kugimiya | 428/516 X |
| 4,701,359 | 10/1987 | Akao | 428/35 |
| 4,720,427 | 1/1988 | Clauson et al. | 428/349 |
| 4,778,697 | 10/1988 | Genske et al. | 428/349 X |
| 4,784,885 | 11/1988 | Carespodi | 428/349 X |
| 4,923,750 | 5/1990 | Jones | 428/349 |
| 5,017,429 | 5/1991 | Akao | 428/349 |
| 5,110,686 | 5/1992 | Taka et al. | 428/516 |
| 5,116,677 | 5/1992 | Jones | 428/349 |
| 5,141,795 | 8/1992 | Kai et al. | 428/349 X |
| 5,154,981 | 10/1992 | Brant et al. | 428/349 X |
| 5,234,733 | 8/1993 | Schloegl | 428/349 X |

FOREIGN PATENT DOCUMENTS

| | | |
|---|---|---|
| 0002606 | 6/1979 | European Pat. Off. |
| 0050455 | 4/1982 | European Pat. Off. |
| 0144999 | 6/1985 | European Pat. Off. |
| 0258527 | 3/1988 | European Pat. Off. |
| 53-54283 | 5/1978 | Japan . |
| 55-12008 | 1/1980 | Japan . |
| 57-59943 | 4/1982 | Japan . |
| 58-160147 | 9/1983 | Japan . |
| 60-36549 | 2/1985 | Japan . |

*Primary Examiner*—Daniel R. Zirker
*Attorney, Agent, or Firm*—Armstrong, Westerman, Hattori, McLeland & Naughton

[57] ABSTRACT

A resin laminate is composed of a heat-sealable layer (A) containing a random copolymer obtainable by co-polymerizing ethylene with an α-olefin having from 4 to 10 carbon atoms, having a density ranging from 0.900 to 0.920 g/cm$^3$, a melt index ranging from 5 to 50 grams per 10 minutes (190 ° C.), and a film thickness ranging from 2 to 15 μm; and a polyolefinic resin layer (B) having a tensile modulus of 4,000 kg/cm$^2$ or higher and a melting point higher than that of the heat-sealable layer (A), in which the heat-sealable layer (A) is laminated on the polyolefinic resin layer (B).

The resin laminate has an excellent heat sealability and is particularly suitable for packing liquid, powdery or granular matters such as various food, beverages, chemicals and the like.

10 Claims, 1 Drawing Sheet

RESIN LAMINATES

This application is a continuation of application Ser. No. 07/830,342 filed Jan. 31, 1992, now abandoned, which was a continuation of application Ser. No. 386,081, filed Jul. 26, 1989, now abandoned.

BACKGROUND OF THE INVENTION

1. Field of the Invention

The present invention relates to a resin laminate and, more particularly, to a resin laminate which is excellent in heat sealability and suitable for packing liquid, powdery or granular matters such as various foods, beverages, chemicals and the like.

2. Description of Related Art

Heretofore, as packaging materials for liquid, powdery or granular matters, such as various foods, beverages, chemicals, cement, sand or the like, there have been employed paper, synthetic resin sheets or films, a laminated material consisting of paper and synthetic resin sheets or films or the like. Packaging materials made up of synthetic resins, particularly polyolefin sheets or films, are employed in many industrial fields because of their excellent formability, water resistance and chemical resistance as well as their high productivity.

For packaging films for packing various goods such as foods and beverages, a good heat sealability is required. In order for there to be a good heat sealability, for instance, a sealing temperature should be low, a range of sealing temperatures should be wide, a sealing strength should be high, a sealability of foreign matters particularly containing liquid matters should be sufficient, and little or no shrinkage in sealing should occur.

In addition, packaging films require properties which would not interfere with a good heat sealability, such as a good film stability and a high rigidity for convertibility. In summary, good packaging films require properties particularly in a favorable balance of convertibility with heat sealability.

Various attempts have heretofore been made to improve packaging materials in heat sealability, therefore transparency, rigidity, impact therefore and the like.

For example, Japanese Patent Publication (laid-open) No. 12,008/1980 discloses packaging bags made up of a multilayer film consisting of inner and outer layers, in which there is employed as an inner layer a random copolymer having a density of 0.915 to 0.940 g/cm$^3$, obtained by copolymerizing ethylene with an α-olefin having 5 to 10 inclusive carbon atoms in the presence of a catalyst consisting of a titanium catalyst component (containing a titanium compound and a magnesium compound) and an organoaluminium compound in order to provide the inner layer with an improved heat sealability. This publication states that the random copolymer has a density ranging preferably from 0.920 to 0.935 g/cm$^3$, a melt index ranging preferably from 1.0 to 5.0, and a film thickness ranging preferably from 5 to 40 μm. It further states that, as an outer layer, there may be employed paper, aluminium foil, and a film of a polymer capable of forming a film, such as polyethylene, polypropylene, poly[vinyl chloride], poly[vinylidene chloride], nylon and polyethylene terephthalate. The inner and outer layers are laminated to form a multilayer film, and the both inner layers of the multilayers are heat-sealed to each other to form a packaging bag.

Japanese Patent Publication (laid-open) Nos. 59,943/1982 and 36,549/1985 disclose ethylene-α-olefin copolymers with a good heat sealability as raw materials for laminating. The former discloses a composition comprising a mixture of an ethylene-α-olefin copolymer having a smaller melt index with an ethylene-α-olefin copolymer having a larger melt index, having a wide distribution of the molecular weights, and improving its convertibility. The latter discloses a composition of polymers for heat sealing, which comprises a mixture of an ethylene-α-olefin copolymer with an ethylenic polymer such as a low density or a high density polyethylene.

Japanese Patent Publication (laid-open) No. 160,147/1983 discloses a heat-sealable coextruded multilayer film, in which its inner layer is composed of a layer of an ethylene-α-olefin copolymer having a density ranging from 0.92 to 0.94 g/cm$^3$, its core layer is composed of a layer of a low-density polyethylene having a density ranging from 0.92 to 0.93 g/cm$^3$, manufactured by high-pressure method and its outer layer is composed of a layer of an ethylene-α-olefin copolymer having a density ranging from 0.91 to 0.93 g/cm$^3$.

Japanese Patent Publication (laid-open) No. 54,283/1978 discloses a multilayer film in which an ethylenevinyl acetate copolymer layer having a lower melting point is laminated on a polyethylene layer having a melting point higher than that of the ethylene-vinyl acetate copolymer and a film thickness from 1 to 10 μm and the ethylene-vinyl acetate copolymer layer is further laminated on a base film such a nylon layer.

The ethylene-α-olefin copolymer layers as have been described hereinabove have a good heat sealability, however, they are insufficient to sealability at low temperatures, sealability when with impurities, a range of sealing temperatures, sealing shrinkage and the like. The conventional multilayer films as have been described hereinabove are good in heat sealability, but they are poor in film forming and rigidity as well as inferior in formability, thus leading to insufficient packaging materials. Furthermore, a film containing vinyl acetate may generate an odor and shrink in a large degree during sealing so that it is insufficient in these respects.

SUMMARY OF THE INVENTION

Therefore, the present invention has the object to provide a resin laminate which is superior to sealability at low temperatures, sealability of impurities, and a resistance to pinholes and good in film forming and convertivity. Tile resin laminate according to the present invention is particularly suitable for packing liquid materials.

In order to achieve the object, the present invention consists of a highly heat-sealable resin laminate comprising: a heat-sealable layer (A) containing a random copolymer from ethylene and therefore an α-olefin having C4 to C10 inclusive and also having a density ranging from 0.900 to 0.920 g/cm$^3$, a melt index ranging from 5 to 50 g/10 minutes(190° C.), and a film thickness ranging from 2 to 15 μm; and a polyolefinic resin layer (B) having a tensile module above 4,000 kg/cm$^2$ and a melting point higher than that of the heat-sealable layer (A). The resin laminate having the above structure may be further laminated on a base film in such a manner that the polyolefinic resin layer (B) is brought into contact with the base film in the same order.

DETAILED DESCRIPTION OF THE PREFERRED EMBODIMENTS

Figure 1:
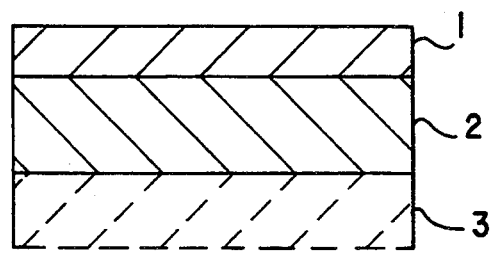
FIG. 1 is a cross-sectional view showing one example of the resin laminate according to the present invention.

The resin laminate according to the present invention will be described more in detail.

The heat-sealable layer (A) is composed of a layer of a random copolymer obtainable by copolymerizing ethylene with an α-olefin having from 4 to 10 inclusive carbon atoms. Such an α-olefin may include, for example, butene-1, pentene-1, hexene-1, 4-methylpentene-1, cotene-1, nonene-1, decene-1 or the like. The α-olefin as a comonomer unit of the random copolymer may be used singly or in combination thereof.

In accordance with the present invention, the random copolymer having the density and melt index within the specified ranges may be suitably chosen from the random copolymers constituted by the α-olefin or α-olefins. A preferred random copolymer is a linear low density polyethylene (LLDPE) containing an α-olefin unit.

The heat-sealable layer (A) may additionally contain a low-crystallinity or non-crystalline ethylene-α-olefin copolymer in an amount ranging up to 30% by weight with respect to the total weight of the heat-sealable layer (A) in order to improve an impact resistance as long as its heat-sealability is not impaired. Such a low-crystallinity or non-crystalline ethylene-α-olefin copolymer may include, for example, ethylene-propylene rubber (EPR), ethylene-propylene-diene rubber (EPDM), and low-crystallinity ethylene-butene-1 copolymer.

The heat-sealable layer (A) has a density ranging generally from 0.900 to 0.920 g/cm$^3$, preferably from 0.900 to 0.915 g/cm$^3$, and a melt index ranging generally from 5 to 50 grams per 10 minutes (190° C.), preferably from 6 to 20 grams per 10 minutes (190° C.).

If the heat-sealable layer (A) has a density below the lower limit of 0.900 g/cm$^3$, rigidity and heat sealability of a laminated film may be reduced, while the heat-sealable layer (A) having a density above the upper limit of 0.920 g/cm$^3$ makes the resulting laminated film poor in heat sealability at low temperatures and an impact strength. If the heat-sealable layer (A) has a melt index smaller than the lower limit of 5 g/10 minutes, its melt viscosity becomes too large and formability is impaired and, if it has a melt index larger than the upper limit of 50 g/10 minutes, a strength between the heat-sealed portion of the resulting film becomes too weak, thereby reducing a film strength. It is further to be noted that, although a melt index for a usual film grade is lower than 4 g/10 minutes (190° C.), the heat-sealable layer (A) having a melt index larger than 4 g/10 minutes (190° C.) is of note to be used for the resin laminate according to the present invention. A provision of the heat-sealable layer (A) having a melt index larger than the usual film grade serves as achieving the object of the present invention.

A film thickness of the heat-sealable layer (A) may range generally from 2 to 15 μm, preferably from 2 to 10 μm. The heat-sealable layer (A) having a film thickness thinner than the lower limit becomes poor in film forming while a film thickness larger than the upper limit may cause shrinkage during sealing.

It is further preferred that the heat-sealable layer (A) has a tensile modulus ranging preferably from 1,000 to 4,000 kg/cm$^2$. The heat-sealable layer (A) having a tensile modulus below the lower limit 1,000 kg/cm$^2$ makes a film strength weaker, while the heat-sealable layer (A) having a tensile modulus greater than the upper limit 4,000 kg/cm$^2$ may adversely affect its heat sealability.

The polyolefinic resin layer (B) is composed of a layer of a polyolefic resin which may include, for example, a polyethylene such as a high density polyethylene, middle density polyethylene, low density polyethylene or linear low density polyethylene, a polypropylene such as an isotactic polypropylene, syndiotactic polypropylene or atactic polypropylene, a polybutene, or poly-4-methylpentene-1 etc. A copolymer of an olefin with a vinyl monomer may be used which may include, for example, ethylene-propylene copolymer, ethylene-vinyl acetate copolymer, ethylene-vinyl chloride copolymer or propylene-vinyl chloride copolymer etc. As polyolefins may be used the polyolefins which are chemically denatured by an unsaturated carboxylic acid or an anhydride thereof or a derivative thereof. Preferred are a high density poly- ethylene, a linear low density polyethylene (LLDPE), a polypropylene, polybutene-1 and poly-4-methylpenetene-1, each having a density of 0.920 g/cm$^2$ or higher.

The polyolefinic resin layer (B) has a tensile modulus of 4,000 kg/cm$^2$ or higher, preferably from 4,000 to 12,000 kg/cm$^2$. If its tensile modulus becomes smaller than the lower limit of 4,000 kg/cm$^2$, a film strength of the resulting film becomes smaller. If it exceeds the upper limit of 12,000 kg/cm$^2$, its heat sealability may become poor.

The heat-sealable layer (A) and the polyolefinic resin layer (B) may additionally contain a variety of additives as long as they do not adversely affect the object sought to be achieved by the present invention. The additives may include, for example, a lesser soluble soluble azo dye, a red colorant, a colorant such as cadmium yellow, chrome yellow, white titanium pigment, an antioxidant such as of a triazole, salicylate, or acrylonitrile type, a plasticizer such as phthalate diester, butanol diester, phosphate diester or the like, and a thermal stabilizer.

It is further to be noted that a melting point of the polyolefinic resin (B) be higher than the heat sealable layer (A) having 4,000 kg/cm$^2$, preferrably 4,000 to 12,000 kg/cm$^2$. A difference of the melting point of the polyolefinic resin (B) from that of the heat-sealable layer (A) may vary with the composition of the heat-sealable layer (A). The melting point of the polyolefinic resin layer (B) may range generally from 120° C. to 160° C.

The polyolefinic resin layer (B) may have a film thickness ranging generally from 5 to 200 μm, preferably from 10 to 100 μm.

The resin laminate according to the present invention may be prepared by coextruding the heat-sealable layer (A) with the polyolefinic layer (B) by means of T-die extrusion forming, inflation extrusion forming or the like at a resin temperature ranging from 180° C. to 300° C. and cooling the laminated material by means of chill rolls at a temperature of 20° C. to 80° C. In laminating the heat-sealable layer (A) on the polyolefinic layer (B), it is preferred that a surface of the polyolefinic layer (B) to be laminated is surface-treated by means of surface oxidation treatment such as corona discharge treatment, chromate treatment, flame treating, hot-air treating, treatment with ozone or ultraviolet rays or the like, or surface abrasion treatment such as sand blasting. Preferred is corona discharge treatment.

The resin laminates according to the present invention may comprise a two-layer laminate in which the heat-sealable layer (A) containing the random copolymer is laminated on the polyolefinic resin layer (B). It may also comprise a three-layer laminate in which a base film (C) is laminated on a surface of the polyolefinic resin layer (B) opposite to the surface thereof on which the heat-sealable layer is laminated. The base film (C) may include, for example, a nylon such as nylon-6, a polyester such as polyethylene terephthalate, a polyvinyl alcohol such as a saponified ethylene-vinyl acetate copolymer, a oriented or non-oriented film or sheet of polypropylene or the like, polycarbonate film, aluminium foil or other metallic foil, or paper. The base film may be of a single layer or multiple layers. It may vary with usage of the resin laminates, however, it may have a film thickness generally from 10 to 100 $\mu$m.

The multilayer resin laminates according to the present invention may be prepared by means of any laminating procedures forming a laminated structure in a film or sheet, such as coextrusion laminating, dry laminating, hot laminating, hot melt laminating, extrusion laminating or the like. It is to be noted herein that, when the base film (C) is laminated on the polyolefinic resin layer (B), it is preferred to subject a laminating surface thereof to surface treatment as have been described hereinabove, particularly corona discharge treatment.

The base film (C) serves as providing the resin laminate with an improved mechanical strength such as rigidity and the heat-sealable layer (A) containing the random copolymer is excellent in heat sealability. Thus the packaging bags formed from the laminates are suitable for packing granular or liquid matters such as food, beverages, cement, sand or the like.

The present invention provides resin laminates which are excellent in sealability at low temperatures, sealability having impurities and sealing for filling liquid matter and which little shrink in sealing. The heat-sealed products give a favorable outlook of a heat-sealed portion without pinholes, a high sealing strength, and a good impact strength. The resin laminates according to the present invention are remarkably favorable in film forming, laminating, printability, and forming into packaging materials although they are highly sealable at low temperatures. Thus the resin laminates according to the present invention can be employed effectively for a sealant for multilayer films as packaging materials and for packing various matters as packaging bags.

The present invention will be described by way of examples.

EXAMPLE 1

Using a resin as shown in Table 1 below, there was formed a resin laminate having a heat-sealable layer (A) and a polyolefinic resin layer (B) in the following manner.

The heat-sealable layer (A) and the polyolefinic resin layer (B) were each molten and extruded through an extruder having a 50 mm nozzle and a 65 mm nozzle, respectively, to a multi-manifold multilayer T-die (a die width: 800 mm) which, in turn, coextruded at the die temperature of 250° C. and cooled by means of chill rolls at 40° C., thereby forming a multilayer film comprising the heat-sealable layer (A) having a film thickness of 7 $\mu$m and the polyolefinic resin layer (B) having a film thickness of 43 $\mu$m.

The multilayer film was measured for its tensile modulus and sealing temperature. The results are shown in Table 2 below. It is noted herein that the sealing temperature was measured as its heat-sealing strength has amounted to 300 grams per 15mm in substantially the same manner as will be described below as "Idemitsu Test Method".

The multilayer film thus obtained was then laminated on a oriented nylon film (C) with 15 $\mu$m thickness yielding a laminated film. The resulting resin laminate has a structure as shown in FIG. 1, in which reference numeral 1 denotes the heat-sealable layer (A) containing the ethylene-$\alpha$- olefin random copolymer, reference numeral 2 denotes the polyolefinic resin layer (B), and reference numeral 3 denotes the base film (C).

The properties of the laminated film are shown in Table 2 below.

EXAMPLE 2

A heat-sealable layer (A) containing the random copolymer as shown in Table 1 above and the polyolefinic resin layer (B) were laminated in the same manner as in Example 1 to give a multilayer film.

A surface of the polyolefinic resin layer (B) of the resulting multilayer film was then subjected to corona discharge treatment at 28W/m²/minute. The surface of the polyolefinic resin layer (B) was coated with an adhesive and then laminated in dry manner with a oriented nylon film (C) having a film thickness of 15 $\mu$m, thereby producing a laminated film. The resulting laminated film has a three-layer structure as shown in FIG. 1.

The properties of the resulting laminated film are shown in Table 2 below.

EXAMPLE 3

A heat-sealable layer (A) containing the random copolymer as shown in Table 1 below and the polyolefinic resin layer (B) were laminated in the same manner as in Example 1 to give a multilayer film.

The multilayer film was measured for its tensile modulus and sealing temperature. The results are shown in Table 2 below. It is noted herein that the sealing temperature was measured as its heat-sealing strength has amounted to 300 grams per 15 mm in substantially the same manner as will be described below as "Idemitsu Test Method".

The multilayer film was then laminated on a oriented nylon film (C) to give a laminated film as shown in FIG. 1. The properties of the laminated film are shown in Table 2 below.

COMPARATIVE EXAMPLES 1-5

In the same manner as in Examples 1 to 3, a heat-sealable layer (A) containing the resin as shown in Table 1 below was laminated on the polyolefinic resin layer by coextrusion, thus yielding a multilayer film which, in turn, was laminated on a oriented nylon film (C) so as to bring the polyolefinic resin layer to come in contact with the nylon film (C) in the same manner as in Examples 1 to 3, thereby giving a laminated film.

In Comparative Examples 1 and 4, the resulting multilayer film was measured for its tensile strength and sealing temperature. The sealing temperature was measured in accordance with the "Idemitsu Test Method" as will be described hereinbelow. The results are shown in Table 2 below.

In Comparative Examples 2, 3 and 5, the resulting multilayer film was then laminated on a drawn nylon film (C), yielding a laminated film. The properties of the laminated film are shown in Table 2 below.

As will be apparent from Table 2 below, the resin laminates obtained in Examples 1 to 3 have a sealing temperature lower than, a range of sealing temperatures wider than, and a sealing shrinkage smaller than those obtained in Comparative Examples 1 to 5.

Evaluation Procedures

The multilayer film having a two-layer structure consisting of the heat-sealable layer (A) and the polyolefinic resin layer (B) as well as the laminated film having at least three layers containing the base film (C) in addition to the above two layers have been evaluated for their properties by the following procedures:

*1. Sealing Temperature (Idemitsu Test Method)

One sheet of the multilayer film was laminated on another sheet of the multilayer film such that their respective heat-sealable layers (A) were heat-sealed at a pressure of 2 kg/cm$^2$ over the period of 1 second. The sealing temperature was measured using a heat gradient tester (Toyo Seiki K. K.) as the temperature when a heat-sealing strength between the respective heat-sealable layers (A) reached 2,000 grams per 15 mm.

*2. Sealability of Foreign Matter (I)

When salad oil was filled as foreign matter, the sealing temperature was measured in substantially the same conditions as above.

*3. Sealability of Foreign Matter (II)

When soy sauce was filled as foreign matter, the sealing temperature was measured in substantially the same conditions as above.

*4. Range of Sealing Temperatures for Filling

A packaging bag (60 mm×70 mm) was filled with soy sauce at the filling rate of 80 bags per minute in a single roll system using a filling packer (half-folding, three-sided sealing filler: Model "KS 324"; Komatsu Seisakusho K.K.). To the bag filled with soy sauce was then applied a load of 100 kg, and a range of sealing temperatures was measured at which the sealing temperatures can endure the load of 100 kg for five minutes or longer.

*5. Sealing Shrinkage

The multilayer films were laminated at the sealing temperature of 145° C. at the above filling conditions to give a packaging bag. The sealing shrinkage was calibrated as follows:

$$\text{Sealing Shrinkage (\%)} = \frac{\text{Thickness of Sealed Portion}}{\text{Total thickness of laminate}} \times 100$$

TABLE 1

| | RESINS | Density g/cm$^3$ | Melt Index g/10 min, (190° C.) | Tensile Strength kg/cm$^2$ | Melting Point (°C.) |
| --- | --- | --- | --- | --- | --- |
| LLDEP 1 | Ethylene-α-olefin copolymer (Idemitsu Sekiyu Kagaku) MORETEC 1018C (C8) | 0.905 | 9 | 2,100 | 118 |
| LLDEP 2 | Ethylene-α-olefin copolymer (Idemitsu Sekiyu Kagaku) MORETEC 0258C (C8) | 0.930 | 2 | 6,400 | 125 |
| LLDEP 3 | Ethylene-α-olefin copolymer (Idemitsu Sekiyu Kagaku) MORETEC 0238C (C8) | 0.920 | 2 | 4,300 | 122 |
| HDPE | High Density Polyethylene (Idemitsu Sekiyu Kagaku) IDEMITSU POLYETHY 440M | 0.954 | 0.9 | 11,000 | 131 |
| EBC *1 | Ethylene-butene-1 copolymer*) | 0.88 | 4 | | 70 |
| EVA *2 | Ethylene-vinyl acetate copolymer | 0.927 | 3 | | 96 |

*1: Mooney viscosity ML$_{1+4}$ = 18 (100° C.)
*2: Content of vinyl acetate unit is 7 wt % in the copolymer.

TABLE 2

| | MULTILAYER FILM (ROLLSTOCK THICKNESS 50 μm, (A)/(B) = 7/43 μm) | | | | LAMINATED FILM (ORIENTED NILON/MULTILAYER FILM = 15/50 μmm) | |
| --- | --- | --- | --- | --- | --- | --- |
| | COMPOSITION (% BY WT) | | ROLLSTOCK PROPERTIES | | PRACTICAL PROPERTIES | |
| | | | TENSILE MODULUS | SEALING TEMP. | *1 SEALING TEMP. | *2 SEALABILITY IN-INPURITIES |
| | LAYER A | LAYER B | (Kg/cm$^2$) | (°C.) | (°C.) | (I) (°C.) |
| EX. 1 | LLDPE 1 | LLDPE 2 | 4500 | 97 | 100 | 114 |
| EX. 2 | LLDPE 1,(80) EBC, (20) | LLDPE 2 | 4300 | 92 | 95 | 110 |
| EX. 3 | LLDPE 1,(90) EBC (10) | HDPE | 8500 | 95 | 98 | 112 |
| CO. EX. 1 | LLDPE 2 | LLDPE 3 | 2200 | 122 | 125 | 135 |
| CO. EX. 2 | LLDPE 2 | LLDPE 2 | 5000 | 123 | 126 | 135 |
| CO. EX. 3 | LLDPE 3 | LLDPE 3 | 1800 | 106 | 110 | 120 |

TABLE 2-continued

| | | | | | | |
|---|---|---|---|---|---|---|
| CO. EX. 4 | LLDPE 2 | HDPE | 9000 | 125 | 128 | 137 |
| CO. EX. 5 | EVA | EVA | 1500 | 94 | 98 | 120 |

| | LAMINATED FILM (ORIENTED NILON/MULTILAYER FILM = 15/50 μmm) | | | |
|---|---|---|---|---|
| | PRACTICAL PROPERTIES *3 SEALABILITY IN-INPURITIES (II) (°C.) | IN-INPURITIES PROPERTIES | | |
| | | *4 RANGE OF SEALING TEMP. FOR FILIG (°C.) | *5 SEALING SHRINKAGE (%) | REMARKS |
| EX. 1 | 117 | 125~150 | 95 | DRY LAMINATED FILM |
| EX. 2 | 113 | 120~150 | 80 | DRY LAMINATED FILM |
| EX. 3 | 115 | 123~150 | 90 | DRY LAMINATED FILM |
| CO. EX. 1 | 138 | 145~150 | 90 | DRY LAMINATED FILM |
| CO. EX. 2 | 138 | 145~150 | 90 | DRY LAMINATED FILM |
| CO. EX. 3 | 138 | 140~150 | 70 | DRY LAMINATED FILM |
| CO. EX. 4 | 139 | 145~150 | 90 | DRY LAMINATED FILM |
| CO. EX. 5 | 125 | 145~160 | 45 | DRY LAMINATED FILM |

What is claimed is:

1. A resin laminate comprising:
   a heat-sealable layer (A) containing a random copolymer obtainable by copolymerizing ethylene with an α-olefin having from 4 to 10 inclusive carbon atoms, having a density ranging from 0.900 to 0.915 g/cm$^3$, and a melt index ranging from 5 to 50 grams per 10 minutes (190° C.); and
   a linear low density polyethylene (LLDPE) layer (B) having a tensile modulus of 4,000 kg/cm$^2$ or higher and a melting point higher than that of the heat-sealable layer (A),
   wherein the heat-sealable layer (A) is laminated on the polyolefinic resin layer (B).

2. The resin laminate of claim 1, wherein the heat-sealable layer (A) comprises a linear low density polyethylene (LLDPE) containing an α-olefin unit or a mixture of a linear low density polyethylene (LLDPE) in an amount of 70% by weight or larger with respect to the total weight of the heat-sealable layer (A) with a low-crystallinity ethylene-butene-1 copolymer in an amount of 30% by weight or lower with respect to the total weight thereof.

3. The resin laminate as claimed in claim 1, wherein the heat-sealable layer (A) has a film thickness ranging from 2 to 15 μm.

4. The resin laminate of claim 3, wherein the heat-sealable layer (A) has a film thickness ranging from 2 to 10 μm.

5. The resin laminate of claim 1, wherein the linear low density polyethylene (LLPPE) layer (B) has a film thickness ranging from 5 to 200 μm.

6. The resin laminate of claim 5, wherein the linear low density polyethylene (LLPPE) layer (B) has a film thickness ranging from 10 to 100 μm.

7. The resin laminate of claim 1, wherein the linear low density polyethylene (LLDPE) layer (B) is laminated on a base film (C) on a surface of the linear low density polyethylene (LLDPE) layer (B) opposite to the surface thereof on which the heat-sealable layer (A) is laminated.

8. The resin laminate as claimed in claim 7, wherein the base film (C) comprises a nylon film.

9. The resin laminate of claim 7, wherein the base film (C) has a film thickness ranging from 10 to 100 μm.

10. The resin laminate of claim 1, wherein the heat-sealable layer (A) has a melt index ranging from 6 to 20 grams per 10 minutes (190° C.).

* * * * *